(12) United States Patent
Gagliardi et al.

(10) Patent No.: US 11,566,649 B2
(45) Date of Patent: Jan. 31, 2023

(54) SPACER ASSEMBLY

(71) Applicant: ILLINOIS TOOL WORKS INC., Glenview, IL (US)

(72) Inventors: Riccardo Gagliardi, Chiaverano (IT); Fulvio Pacifico Yon, Donnas (IT)

(73) Assignee: ILLINOIS TOOL WORKS INC., Glenview, IL (US)

( * ) Notice: Subject to any disclaimer, the term of this patent is extended or adjusted under 35 U.S.C. 154(b) by 365 days.

(21) Appl. No.: 17/006,273

(22) Filed: Aug. 28, 2020

(65) Prior Publication Data

US 2021/0071696 A1 Mar. 11, 2021

(30) Foreign Application Priority Data

Sep. 5, 2019 (EP) .................................... 19195547

(51) Int. Cl.
*F16B 5/02* (2006.01)
*F16B 37/04* (2006.01)
*F16B 5/06* (2006.01)
*F16B 21/07* (2006.01)

(52) U.S. Cl.
CPC ............ *F16B 5/065* (2013.01); *F16B 5/0233* (2013.01); *F16B 5/0657* (2013.01); *F16B 5/0664* (2013.01); *F16B 37/044* (2013.01); *F16B 21/076* (2013.01); *F16B 37/043* (2013.01)

(58) Field of Classification Search
CPC ..... F16B 5/0233; F16B 37/041; F16B 37/043
See application file for complete search history.

(56) References Cited

U.S. PATENT DOCUMENTS

| | | | | |
|---|---|---|---|---|
| 5,288,191 A * | 2/1994 | Ruckert | ................. | F16B 5/0233 411/432 |
| 7,488,135 B2 * | 2/2009 | Hasegawa | ............. | F16B 5/0233 403/22 |
| 7,891,927 B2 * | 2/2011 | Burger | .................. | F16B 5/0233 411/908 |
| 8,002,507 B2 * | 8/2011 | James | ....................... | B64C 1/20 411/85 |
| 8,920,089 B1 * | 12/2014 | Stewart | ................. | F16B 5/0208 411/433 |
| 9,482,264 B2 * | 11/2016 | Lütgenau | .............. | F16B 39/225 |
| 9,771,962 B2 * | 9/2017 | Metten | ................... | F16B 5/0233 |
| 10,557,488 B2 * | 2/2020 | Bräutigam | ............ | F16B 5/0233 |
| 2006/0226312 A1 * | 10/2006 | Masuch | ................ | F16B 5/0233 248/188 |
| 2009/0190993 A1 | 7/2009 | De Gelis | | |

(Continued)

FOREIGN PATENT DOCUMENTS

DE 102006034463 B3 1/2008
DE 102015103491 A1 8/2016

(Continued)

*Primary Examiner* — Flemming Saether
(74) *Attorney, Agent, or Firm* — Thompson Hine LLP (57) ABSTRACT

A spacer assembly for spaceably coupling a first and second component with a threaded connection bolt, each one of the first and second component provided with one or more fitting apertures. The spacer assembly includes a support member, a base member, and a spacer member having resilient friction elements configured to provide an interference fit engagement with a predetermined friction force with a threaded connection bolt, during use.

22 Claims, 9 Drawing Sheets

(56) References Cited

U.S. PATENT DOCUMENTS

2018/0172043 A1    6/2018  Bräutigam
2022/0065284 A1*   3/2022  Li ........................ F16B 37/041

FOREIGN PATENT DOCUMENTS

DE    102016212549 A1    1/2018
DE    102018201496 A1    8/2019
EP         1764516 A2    3/2007

* cited by examiner

SPACER ASSEMBLY

The present invention relates to the general field of fasteners and mechanical connectors, and in particular, but not exclusively, to an improved spacer assembly for spaceably coupling a first component and a second component.

INTRODUCTION

During industrial assembly processes, such as, for example, the assembly of a vehicle or a at least a portion of a vehicle, e.g. the electric components or interior, usually involves connecting, linking, coupling and mounting of many different components utilising many different types of fasteners, connecting elements, mounts, brackets and so on. Sometimes spacer elements are needed to connect or couple two components that are spaced apart or are required to maintain a certain distance between the two components. For example, a headlight may be fastened to a car body structure at a specific distance, though, the distance may vary due to manufacturing tolerances. Consequently, variable spacer devices or adjustable screw units are used to compensate for any tolerances.

Such spacer devices are well known in the art and typically consist of at least two parts, one part forms a supporting part and is connected to the first component. The second part, which forms a spacer part, is screwed into the support part by a left-hand thread forming an end surface that is spaced apart from the second component. As the connecting screw is fitted into the spacer part, some frictional element engages with the screw. When the screw is rotated, the spacer part is carried along by the friction fit provided with the screw and threadingly moves out of the supporting part until it bridges the gap between the two spaced apart components.

Typically, the individual components of such spacer devices or adjustable screw units have a relatively compact design with minimized axial displacement of the spacer part. Also, the handling and ease of use during pre-assembly of known spacer devices is made difficult due to its compact design. Further, known spacer devices are made from metal, making it relatively complex and rather expensive to manufacture, because different elements (e.g. the friction element) have to be added to the device to provide its functionality.

Another problem occurring with known spacer devices is the loss of its individual components during transport and handling. In particular, spacer devices are usually transported or handled in a pre-assembled state, i.e. the spacer part is screwed into the support part. However, during transport or handling, vibrations are likely to unscrew the spacer part from the support part eventually disassembling the components of the spacer device.

Figure 1A:
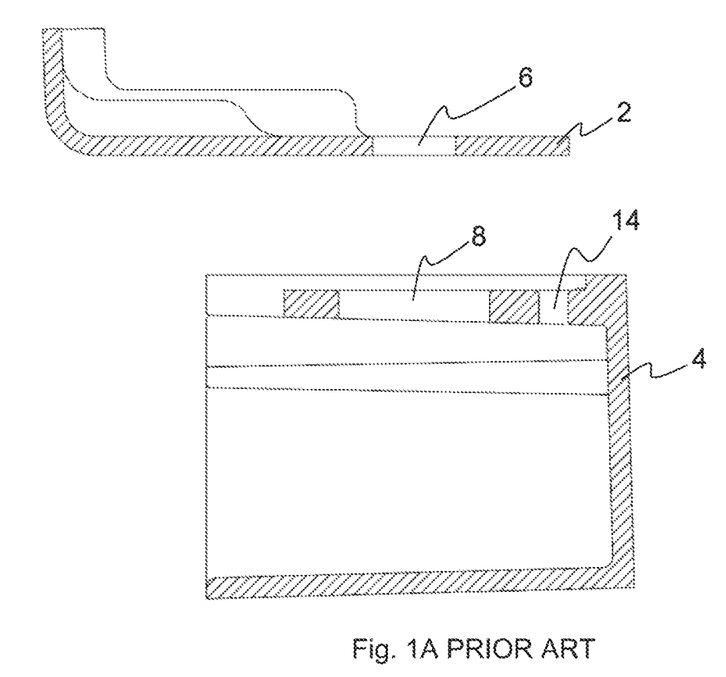
FIGS. 1A-1C show a simplified schematic illustration of a known spacer used to fix a first component to a second component, where (FIG. 1A) the two components are disassembled, (FIG. 1B) the spacer is placed between the two components and aligned for inserting the bolt, and (FIG. 1C) the bolt is screwed into a nut so as to fasten the two components together.
Figure 1B:
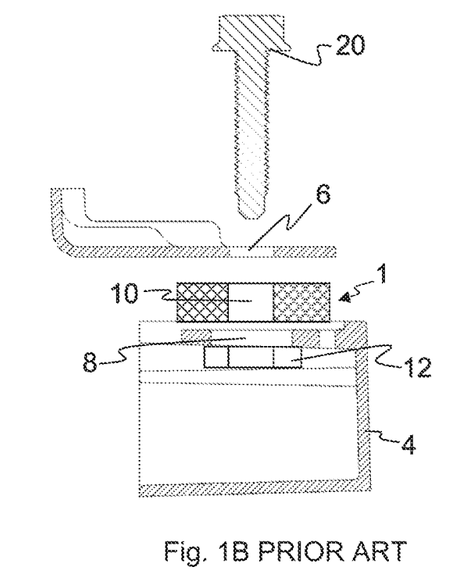
Figure 1C:
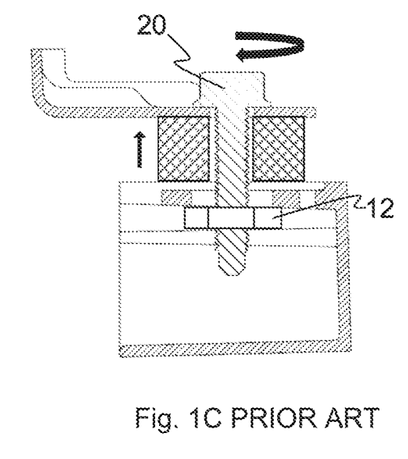

FIGS. 1A-1C show a simplified schematic illustration of a spacer device 1 used to connect a first component 2 (e.g. a metal bracket) to a second component 4 (e.g. a plastic body or housing). Once the spacer device 1 is positioned between the first and second component 2, 4, a threaded connection bolt 20 is inserted through respective apertures 6, 8, 10 and threadingly engaged with a nut 12. The rotation of the connection bolt 20 activates the spacer device 1 until first and second component 2, 4 are fastened in a spaced relation to each other, as previously described.

Consequently, it is desirable to provide an improved spacer assembly adapted to eliminate or mitigate at least some of the above problems.

SUMMARY OF THE INVENTION

According to a first aspect of the present invention, there is provided a spacer assembly for spaceably coupling a first and second component with a threaded connection bolt, each one of the first and second component provided with one or more fitting apertures, comprising:

a support member, comprising a planar support plate having a through-hole with an internal support thread configured to threadingly engage with the threaded connection bolt, and a first clip portion projecting from a first support plate end in a direction substantially normal to said planar support plate, said support member being releasably mountable to the first component so as to axially align said through-hole with a first one of the one or more fitting apertures of the first component, during use;

a base member, comprising a planar base plate having an upper surface and a lower surface opposite said upper surface, a cylindrical through-hole mount with an internal mount thread projecting from said upper surface in a direction substantially normal to said planar support plate to a predetermined mount length, and an aperture at a first base plate end configured to receive and movably retain said first clip portion, during use;

a spacer member, comprising a cylindrical body having a central axis and an external spacer thread, configured to operably engage with said through-hole mount so as to axially move said spacer member relative to said base member when rotating said spacer member relative to said base member, and an axial through-hole with a plurality of inwardly projecting resilient friction elements configured to provide an interference fit engagement with a predetermined friction force with the threaded connection bolt, during use;

wherein the thread-engagement between said internal mount thread and said external spacer thread is opposite to the thread-engagement between said internal support thread and the threaded connection bolt.

Advantageously, said plurality of resilient friction elements may be provided inside a central recess at a first end of said cylindrical body. Preferably, said plurality of resilient friction elements may be arranged radially relative to said central axis so as to form an extension of said axial through-hole. Even more preferably, said plurality of resilient friction elements are an integral part of said cylindrical body. Advantageously, said plurality of resilient friction elements comprises any one of radially spaced apart elastic collar members and rib member arranged between said radially spaced apart collar members.

The spacer assembly of the present invention provides the advantage of improved internal friction elements between the threadingly rotatable spacer member and the threaded connection bolt. In particular, the resilient friction elements are an integral part of the spacer member (i.e. an extension of the through hole) and are adapted to provide a calibrated friction force when engaging with the threaded connection bolt so as to axially move the spacer member out of the base member to bridge the space between the two components. The integral friction elements provide the advantage of minimized complexity reducing the manufacturing costs, as well as, improved performance.

Advantageously, said spacer member may further comprise a flange member provided at a second end of said cylindrical body, opposite said first end, adapted to stoppingly engage with said through-hole mount during use. Preferably, said flange member may comprise a resilient finger member projecting from an edge portion of said flange member in a direction parallel to said central axis towards said first end of said cylindrical body. Even more preferably, said resilient finger member may be elastically deformable in at least a direction radial to said central axis.

Advantageously, said base member may further comprise at least a first locking element, configured to interferingly engage with an end portion of said resilient finger member, and a second locking element, circumferentially spaced apart from said first locking element about said central axis and configured to stoppingly engage with said end portion of said resilient finger member, during use. Preferably, each one of said first locking element and said second locking element may be provided on said upper surface of said planar base plate projecting normally away from said upper surface and radially outward from an outer surface of said cylindrical through-hole mount, said first locking element having a first radial length and said second locking element having a second radial length that is greater than said first radial length. Suitably, said first locking element may comprise a cam surface, facing radially outward from said central axis, adapted to slidingly engage with said end portion of said resilient finger member so as to move said end portion of said resilient finger member radially outward and over said first locking element during rotation of said spacer element relative to said through-hole mount.

Advantageously, said first locking element and said second locking element may project away from said upper surface to a predetermined distance from said upper surface. Preferably, said predetermined distance may be substantially equal to the thread pitch of said mount thread.

Advantageously, said resilient finger member may project to a length substantially equal to said mount length.

This provides the advantage that the spacer assembly can be locked in its pre-assembled state allowing transport and handling of the spacer assembly without the risk of losing any one of the components due to disassembly caused by vibrations or other movements. In addition, the locking members of the base member and cooperating resilient finger member of the spacer member provide a stop that only engages when the spacer member is fully screwed into the base member preventing over rotation and potential damage of the engaging threads. Further, the particular height of the locking elements (i.e. ca. the length of the thread pitch) ensures that the resilient finger of the spacer element will only lock with any one of the locking elements when the spacer member is fully screwed into the base member. In reverse, the resilient finger will disengage from the locking elements and move out of engagement through the first full rotation of the spacer member.

Advantageously, said base member may further comprise a second clip portion at a second base plate end, opposite said first base plate end, projecting from said lower surface in a direction substantially normal to said lower surface, configured to be movably secured by a second one of the one or more fitting apertures of the first component. Preferably, each one of said first and second clip portion may be configured to allow at least linear movement along an axis parallel to said center axis.

Advantageously, said predetermined friction force of said interference fit engagement between said mount thread and said spacer thread may be greater than the torque required to rotate said spacer member relative to said through-hole mount, during use.

Advantageously, the length of said cylindrical body of said spacer member may be greater than said mount length. This provides the advantage that the spacer member can be displaced further than conventional spacer devices while maintaining a longer thread portion in engagement, minimizing the risk of damage due to an increased load on a smaller thread section Advantageously, each one of said internal mount thread and corresponding said external spacer thread may be a left-hand thread, and said internal support thread may be a right-hand thread.

Advantageously, said base member and said spacer member may be formed from a plastic material. Preferably, said plastic material may comprise a polymer or a polymer compound material. This provides the advantage of considerably reducing manufacturing costs, as well as, the weight of the spacer assembly without compromising its functionality and performance. In addition, the use of plastic material for at least the spacer member provides a friction-fit engagement with the threaded connection bolt without damaging the bolt thread or its coating.

Advantageously, said support member may be made from metal.

BRIEF DESCRIPTION OF THE DRAWINGS

Embodiments of the invention will now be described, by way of example only, with reference to the accompanying drawings, in which.

DETAILED DESCRIPTION OF THE PREFERRED EMBODIMENT(S)

The described example embodiment relates to an adjustable spacer assembly suitable for connecting two components. The embodiment(s) of the invention are normally applied in vehicles. Although the invention is described with respect to vehicles, the invention is not restricted to vehicles altogether, but may also be used in other structures requiring attachment of accessories or peripheral components to a structure.

Certain terminology is used in the following description for convenience only and is not limiting. The words 'right', 'left', 'lower', 'upper', 'front', 'rear', 'upward', 'down' and 'downward' designate directions in the drawings to which reference is made and are with respect to the described component when assembled and mounted. The words 'inner', 'inwardly' and 'outer', 'outwardly' refer to directions toward and away from, respectively, a designated centerline or a geometric center of an element being described (e.g. central axis), the particular meaning being readily apparent from the context of the description.

Further, as used herein, the terms 'connected', 'attached', 'coupled', 'mounted' are intended to include direct connections between two members without any other members interposed therebetween, as well as, indirect connections between members in which one or more other members are interposed therebetween. The terminology includes the words specifically mentioned above, derivatives thereof, and words of similar import.

Further, unless otherwise specified, the use of ordinal adjectives, such as, "first", "second", "third" etc. merely indicate that different instances of like objects are being referred to and are not intended to imply that the objects so described must be in a given sequence, either temporally, spatially, in ranking or in any other manner.

Figure 2:
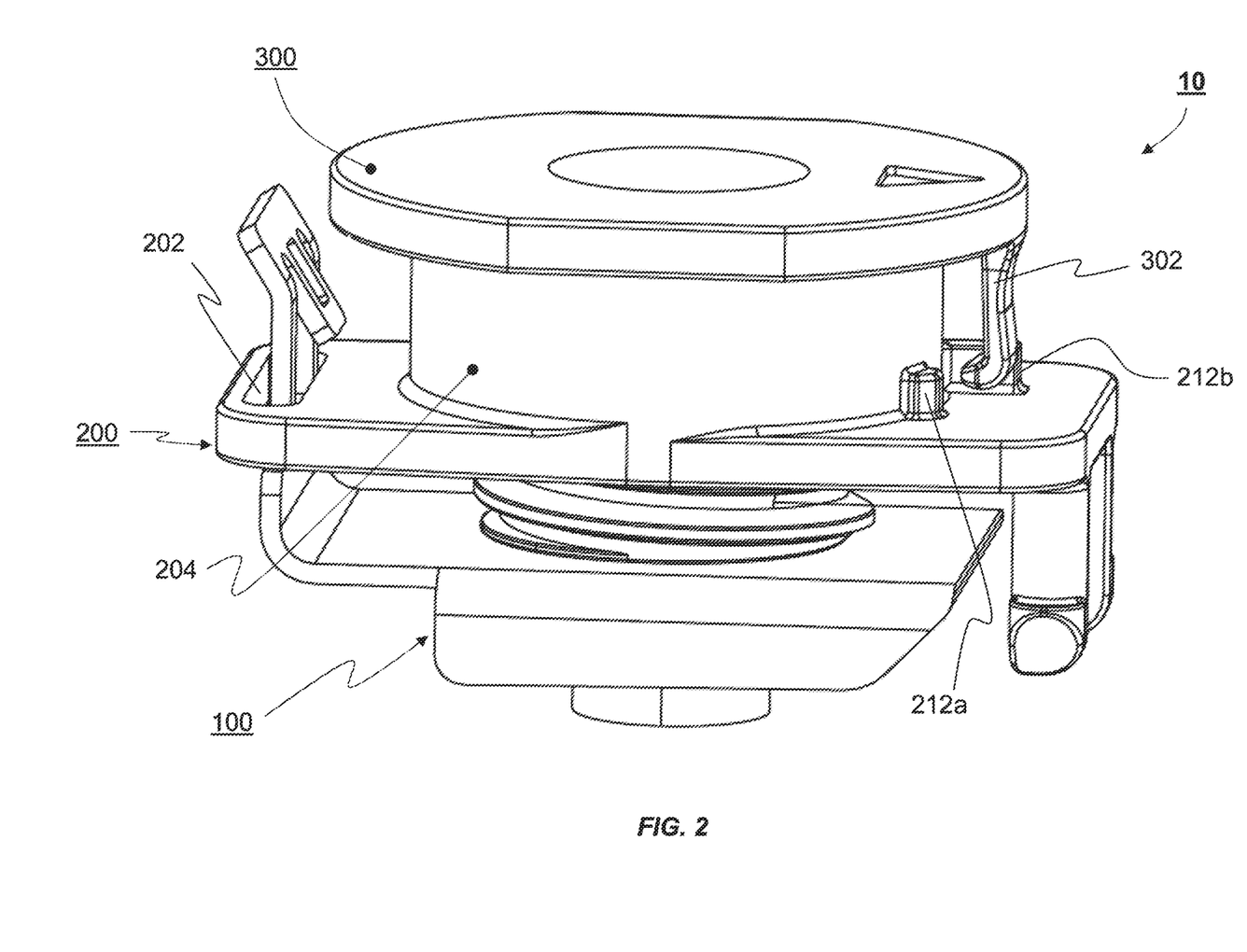
FIG. 2 shows a perspective illustration of an embodiment of the present invention when pre-assembled for transport or handling.
Figure 3A:
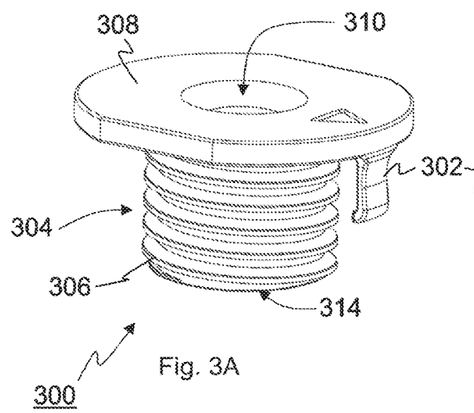
FIGS. 3A-3F show an illustration of an example embodiment of the spacer member, where (FIG. 1A) perspective top view, (FIG. 1B) perspective bottom view, (FIG. 1C) top view, (FIG. 1D) bottom view, (FIG. 1E) side view and (FIG. 1F) cross-sectional side view.
Figure 3B:
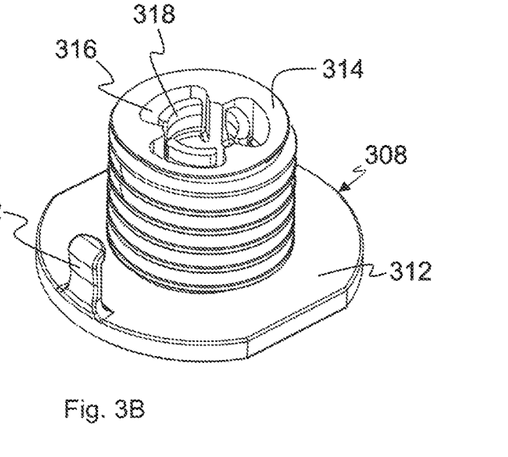
Figure 3C:
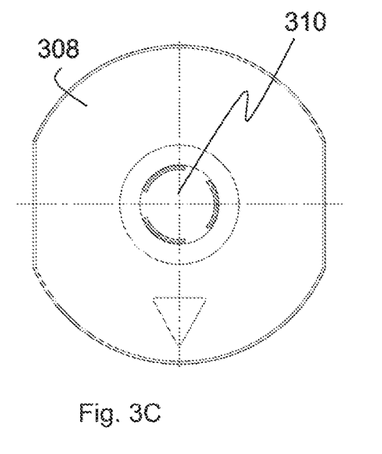
Figure 3D:
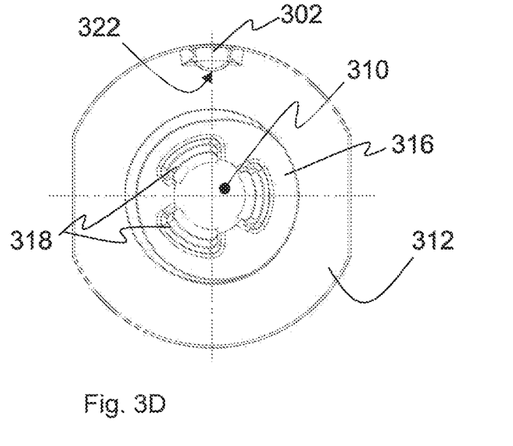
Figure 3E:
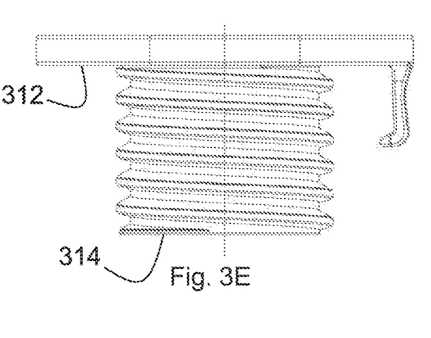
Figure 3F:
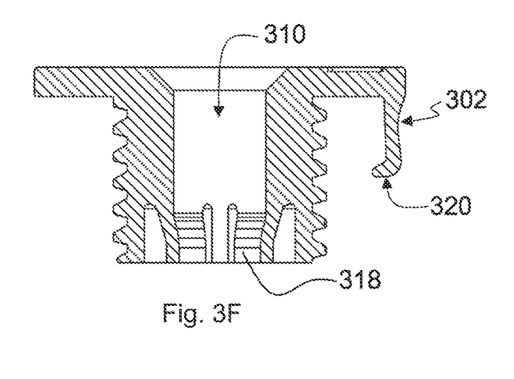
Figure 4A:
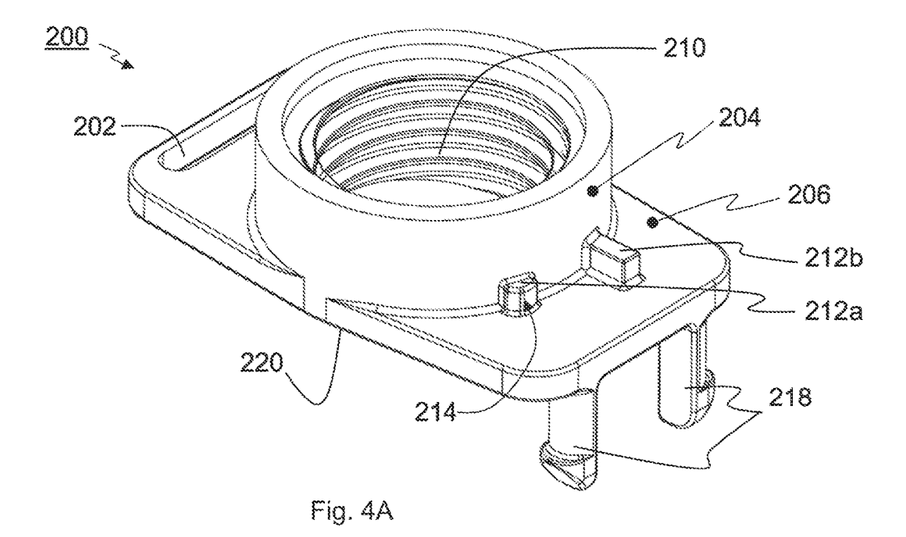
FIGS. 4A-4E shows an illustration of an example embodiment of the base member, (where FIG. 1A) perspective top view, (FIG. 1B) top view, (FIG. 1C) front view, (FIG. 1D) side view and (FIG. 1E) cross-sectional side view.
Figures 4B, 4C:
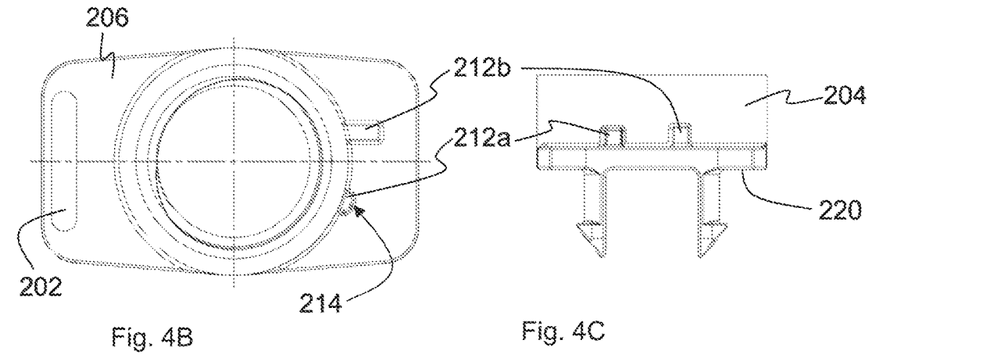
Figure 4D:
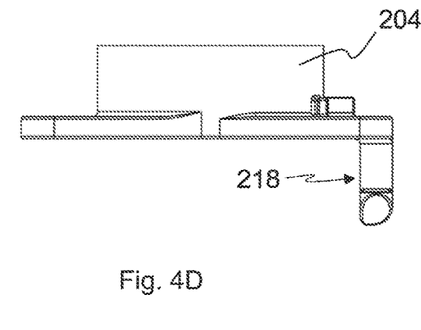
Figure 4E:
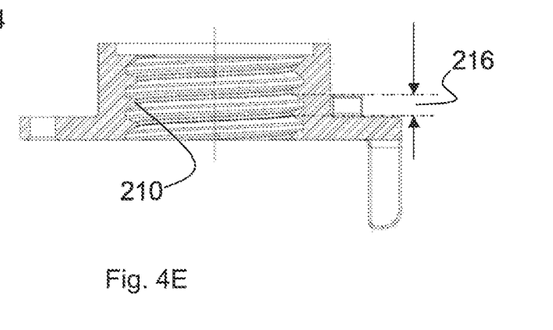
Figure 5A:
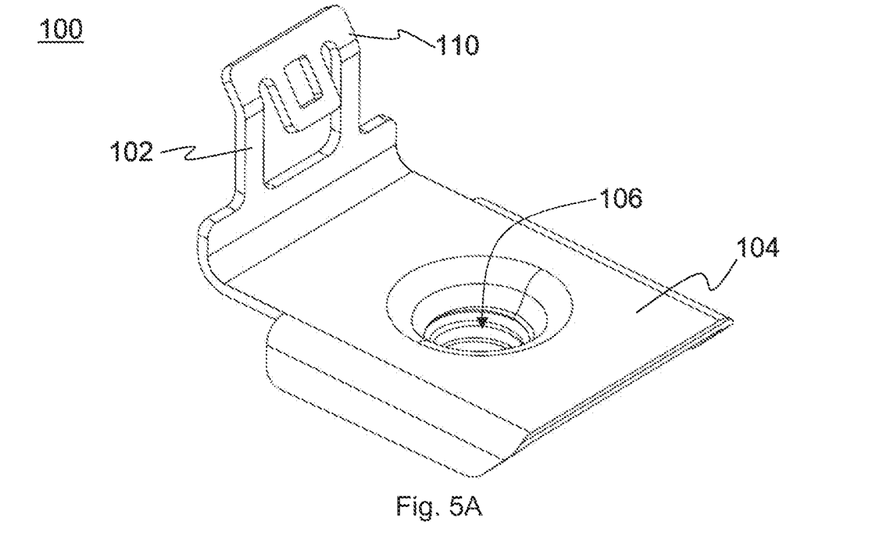
FIGS. 5A-5E shows an illustration of an example embodiment of the support member, where (FIG. 1A) perspective top view, (FIG. 1B) top view, (FIG. 1C) front view, (FIG. 1D) side view and (FIG. 1E) cross-sectional side view.
Figure 5B:
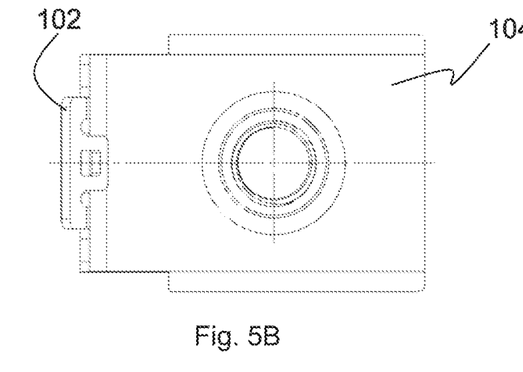
Figure 5C:
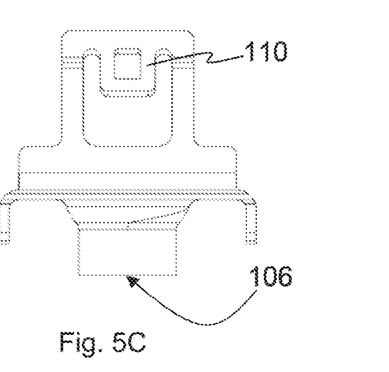
Figure 5D:
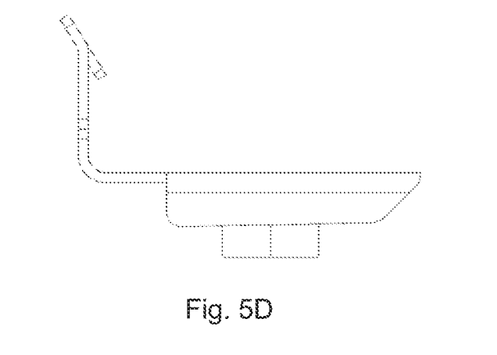
Figure 5E:
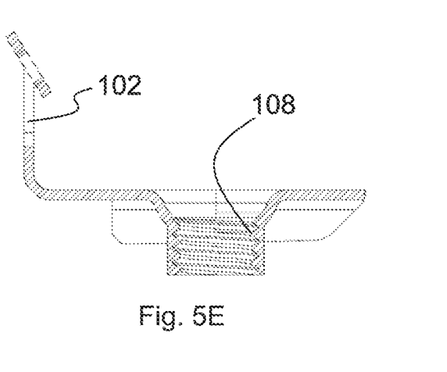

Referring now to FIG. 2, an example embodiment of a spacer assembly 10 is shown in its pre-assembled state, i.e. a metal support member 100 is clipped into the corresponding aperture 202 of a plastic base member 200 and a plastic spacer member 300 is fully screwed into the through-hole mount 204 of the base member 200 and locked into position via the engaging locking elements 212a, 212b and finger member 302. In this pre-assembled locked state, the spacer assembly 10 is transportable without the risk of disassembly (and loss of parts) from vibrations etc.

The spacer member 300 is now described in detail referring to FIGS. 3A-3F. The spacer member 300 comprises a cylindrical body 304 having a central through-hole 310 and an external left-hand thread 306 along its length. A flange 308 is provided at a top end of the cylindrical body 304 and a resilient finger member 302 is provided at the edge of the flange 308 projecting from a bottom surface 312 towards a bottom end 314 of the cylindrical body 304. The finger member 302 comprises an end portion 320 facing towards the cylindrical body 304 and having a rounded surface profile 322.

A central recess 316 is provided at the bottom 314 housing three resilient friction elements 318 extending from the end of the through hole 310 into the recess 316. The three friction elements 318 are circumferentially arranged and spaced apart equidistant from each other. The inner diameter provided by the resilient friction elements 318 is smaller than the inner diameter of the through hole 310, so as to form an interference fit for a suitably sized threaded connection bolt 20, i.e. the inserted bolt 20 will push the three friction elements 318 apart to then exert a predetermined friction force onto the threaded connection bolt 20. It is understood by the person skilled in the art that any suitable number of circumferentially arranged and spaced apart friction elements 318 may be used. Also, the friction elements 318 may be spaced apart at varying distances from each other.

Referring to FIGS. 4A-4E, the base member 200 comprises a planar support plate 206 having a threaded through-hole mount 204 projecting from an upper surface 208. The through hole dimensions and left-hand internal thread 210 are configured to match the outer diameter and external thread 306 of the spacer 300 so that the spacer member 300 can threadingly engage with the though-hole mount 204 of the base member 200. An aperture 202 is provided at one end of the planar base plate 206 and is configured to retainingly receive a clip portion 102 of the support member 100. A first locking element 212a (retainer) is provided on the upper surface 208 extending radially outward from an outer surface of the through-hole mount 204. A second locking element 212b (stop) is provided on the upper surface 208 extending (approximately) radially outward from the outer surface of the through-hole mount 204 and circumferentially spaced apart from the first locking element 212a. Both, first and second locking elements 212a, 212b have a predetermined height from the upper surface 208, i.e. ca. the thread pitch 216 of the internal thread 210. The second locking element 212b is longer (in a radial direction from the through-hole mount 204) than the first locking element 212a. The first locking element 212a has a radially outward facing surface 214 with a rounded profile adapted to slidingly engage with the rounded end portion 320 of the finger member 302 during use. In particular, both, the rounded profile of the outward facing surface 214 of the first locking element 212a and the rounded end portion of the finger member 302 are adapted to slidingly engage during rotation of the spacer member 300 relative to the base member 200 such that the resilient finger member 302 is elastically bent radially outward and over the first locking member 212a to move to either side of the first locking member 212a depending on the direction of rotation. The radial length of the second locking member 212b is such that it provides a stop to the finger member 302 of the rotating spacer member 300, i.e. it is not possible to bend the resilient finger member 302 over the longer second locking element 212b.

A clip 218 is provided at an end portion of the planar base plate 206 opposite the aperture 202. The clip 218 is projecting from a lower surface 220 into a direction opposite the through-hole mount 204. The clip 218 is configured to removably couple to one of the apertures provided in the housing of one of the two components that are connected. In this particular example, clip 218 comprises two resilient spaced apart clip members each having a stepped end portion adapted to lockingly engage with the aperture of the housing. However, it is understood by the person skilled in the art, that any other suitable clip design may be used.

The internal left-hand thread 210 is designed (thread thickness and pitch) so as to provide a high torque force when operably engaged with the external left-hand thread 306 of the spacer member 300.

Referring to FIGS. 5A-5E, the support member 100 is typically made from metal (e.g. cut or stamped from sheet metal) comprises a planar support plate 104 having a central through-hole 106 with an internal thread 108 (e.g. a standard metric thread suitable to threadingly couple with a standard metric threaded bolt 20). In this embodiment, the internal thread 108 is a right-hand thread, i.e. the internal thread 108 has to run in an opposite direction than the thread engagement between the spacer member 300 and the base member 200. The planar support plate 104 is shaped so as to provide a snug fit and axial alignment between the central through-hole 106 and an aperture of the housing when slidingly inserted into the housing of the component. A clip portion 102 is extending from an end portion of the planar support plate 104 in a direction substantially perpendicular to the planar support plate 104, i.e. towards and through the aperture 202 of the base member 200 during assembly. An end portion 110 of the clip portion 102 is designed so as to allow the end portion 110 to freely move into the aperture 202 but prevent the end portion 110 from moving out of the aperture 202 without further intervention from a user. When coupled to the base member 200, support member 100 is able to move relative to the base member 200 within the confines provided by the coupling between the clip 102 and the aperture 202 (e.g. limited liner movement relative to the base member 200, up and down, as well as, limited rotational movement of the support member 100 about the end portion 110 when engaged with the aperture 202).

FIGS. 6A-6E shows a partly assembled spacer assembly 10 with the spacer member 300 fully locked with base member 200, i.e. the cylindrical body 304 is screwed into the through-hole mount 204 until the flange 308 abuts with the top end of the through-hole mount 204 and the resilient finger member 302 is locked between the first locking element 212a and the second locking element 212b. In particular, and as illustrated in the series of cross-sectional FIGS. 6B to 6D, spacer member 300 is screwed into the threaded through-hole mount 204 by rotating spacer member 300 counter-clockwise (left-hand thread) until the rounded end portion 320 of the finger member 302 engages with the rounded outward facing surface 214 of the first locking member 212a. At this point, the rounded end portion 320 is elastically pushed out and over by the rounded outward facing surface 214 of the first locking member 212a. The rotation of spacer member 300 is eventually stopped by the second locking element 212b. In this position, flange 308 abuts the top end portion of the trough-hole mount 204 and finger member 320 is secured between the first and second locking element 212a, 212b. The second locking element 212b will prevent over-rotating the spacer member 300 and potentially damage threads 210 and 306.

When unlocking the spacer member 300, the spacer member 300 is simple rotated clockwise so as to until the rounded end portion 320 of the finger member 302 engages with the rounded outward facing surface 214 of the first locking member 212a. At this point, the rounded end portion 320 is elastically pushed out and over by the rounded outward facing surface 214 of the first locking member 212a. During further rotation of the spacer member 300, resilient finger member 302 is around the through-hole mount 204 and upwards following the pitch of the thread engagement 306, 210 such that finger member 302 is moved above and free of the locking elements 212a, 212b after one revolution.

Figure 6A:
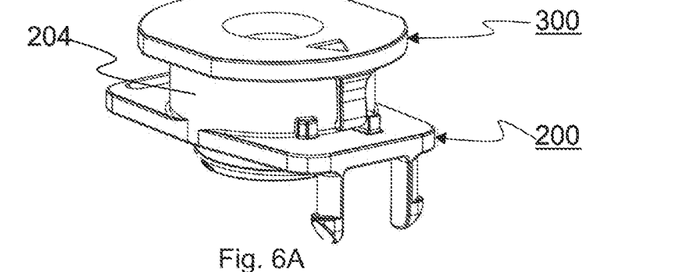
FIGS. 6A-6E shows a schematic illustration of assembling base member and spacer member, where (FIG. 1A) perspective top view, (FIG. 1B) engaging spacer member into the through-hole mount of the base member, (FIG. 1C) spacer member is screwed to the bottom of the though-hole mount, (FIG. 1D) the spacer member is fully inserted into the through-hole mount and the finger member is locked with the locking elements, (FIG. 1E) a threaded connection bolt is inserted into the through hole of the spacer member engaging the resilient friction elements at the bottom end of the spacer member.
Figure 6B:
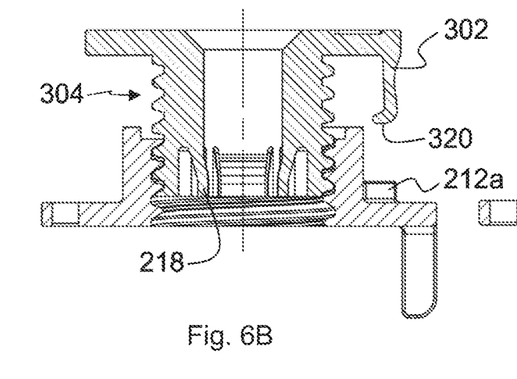
Figure 6C:
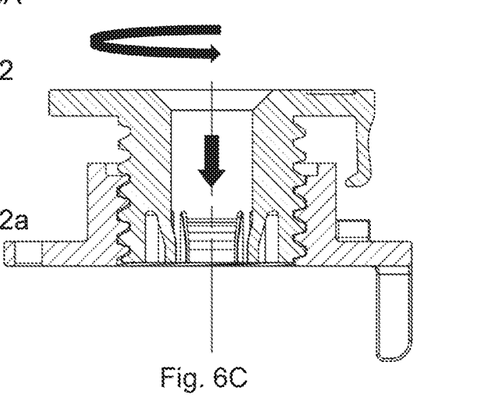
Figures 6D, 6E:
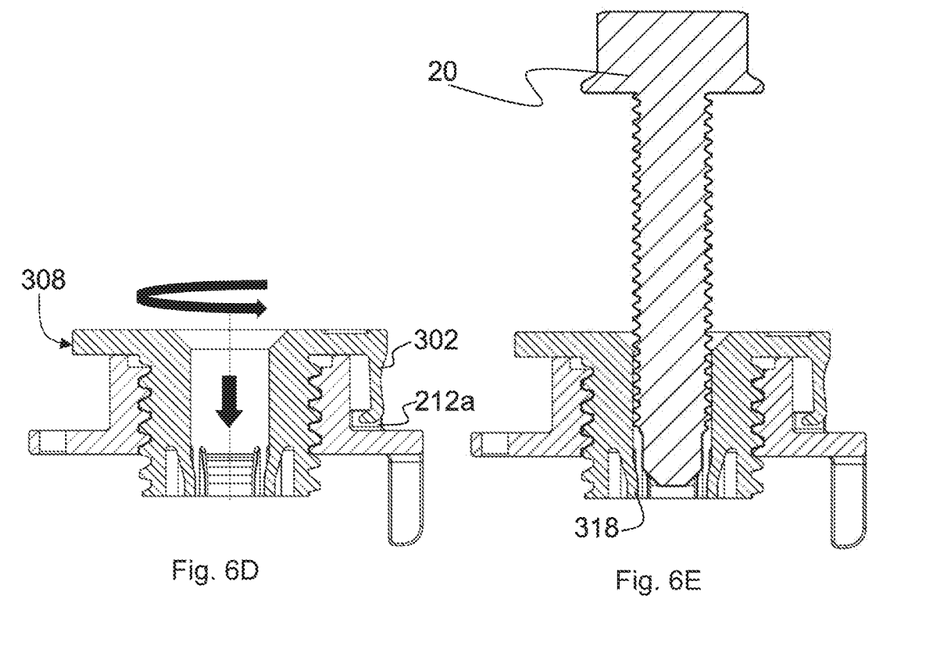
Figure 7A:
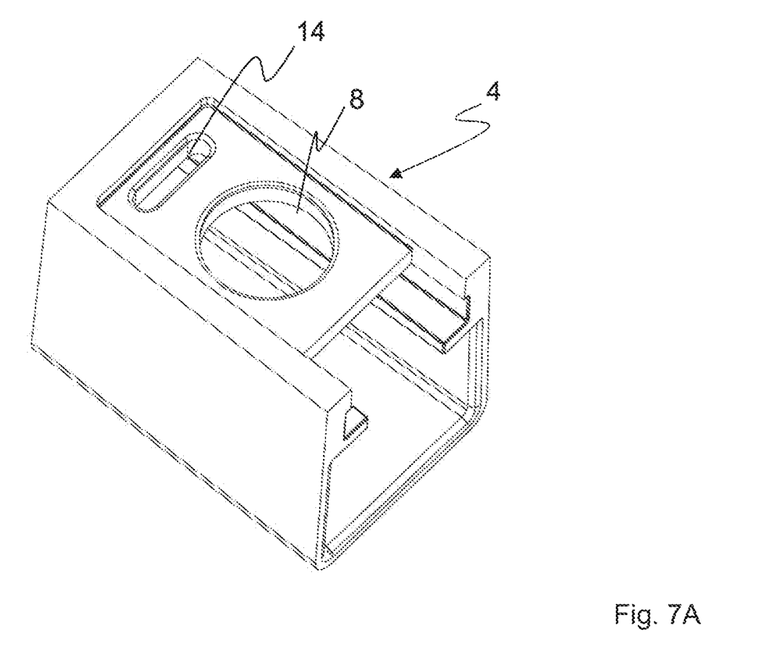
FIGS. 7A-7B shows a perspective schematic illustration of (FIG. 7A) the special housing (i.e. component for connection) for the support member and (FIG. 7B) the pre-assembled spacer assembly being mounted to the special housing, i.e. the support member is inserted into the housing.
Figure 7B:
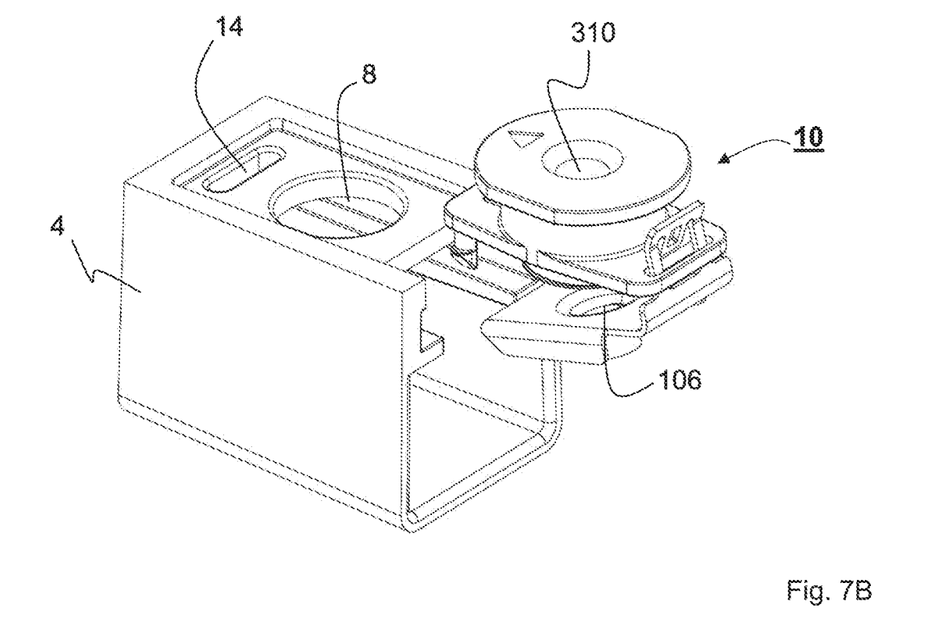

FIG. 6E shows threaded connection bolt 20 inserted into through-hole 310 of spacer member 300 and pushed towards engagement with the friction elements 318. It is understood that the friction fit between the connection bolt 20 and the friction elements 318 is stronger that the torque required to threadingly rotate the spacer member 300 relative to the through-hole mount 204 and axially move the spacer member 300 out of the through-hole mount 204.

During use, spacer assembly 10 may be used to fasten headlights to a car body structure (e.g. metal bracket 2), while automatically compensating for the gap between the two parts when screwing connection bolt 20 into the threaded through-hole 106 of the headlight housing 4.

In particular, referring now to FIGS. 7A-7B, 8A-8C and 9A-9B, spacer assembly 10 is transported and delivered pre-assembled, i.e. spacer member 300, base member 200 and support member 100 are assembled in its locked state where the finger member 302 is lockingly engaged with the locking elements 2012a and 212b, preventing accidental unscrewing of the spacer member 300 (e.g. due to vibrations during transport) and potential loss of any component.

Once delivered, the support member 100 of the pre-assembled spacer assembly 10 is inserted into the housing 4 such that the threaded through-hole 106 is axially aligned underneath a central aperture 8 of the housing 4. At the same time, clip 218 is pushed into the aperture 14 of the housing 4, movably securing the base member 200 into position, i.e. coupled spacer member 300 and base member 200 are able to move linearly relative to the housing (limited up and down movement).

Figure 8A:
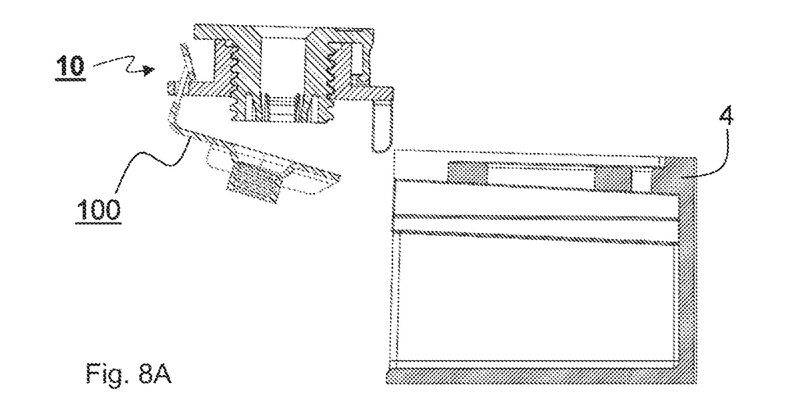
FIGS. 8A-8C shows a schematic cross-sectional illustration of connecting two components via the spacer assembly of the present invention, where (FIG. 8A) support member is inserted into the housing and aligned with a first aperture, (FIG. 8B) base member is clipped into a second aperture of the housing, and (FIG. 8C) the second component is fastened to the first component with a connection bolt actuating the spacer assembly so as to engage both components before securing he bolt with the threaded through hole of the support member.
Figure 8B:
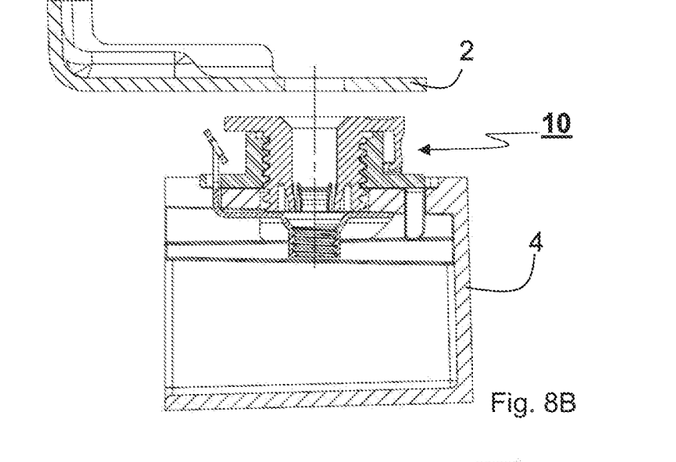
Figure 8C:
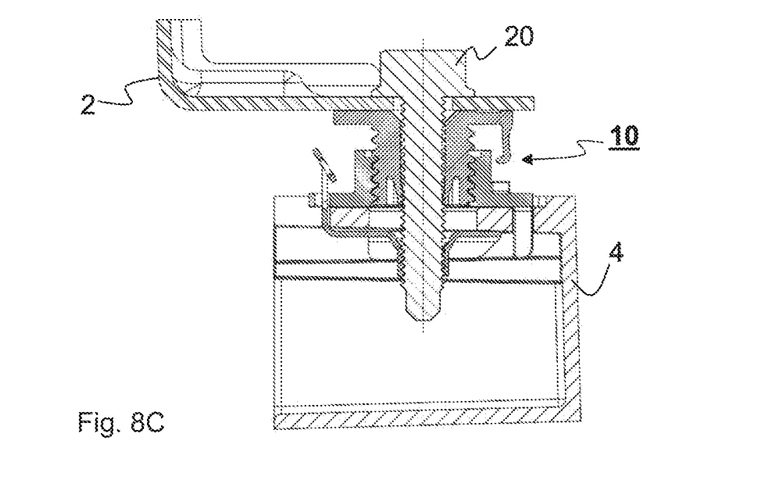
Figure 9A:
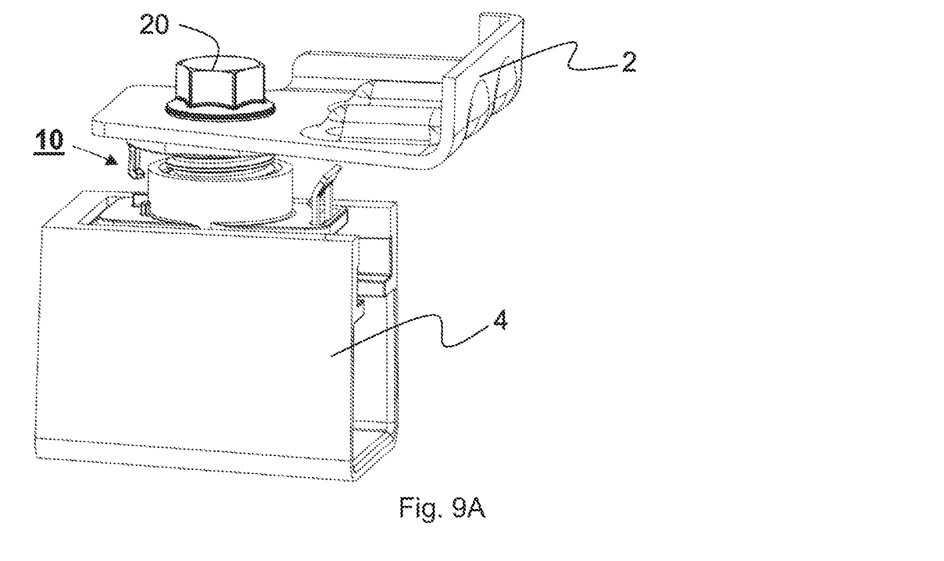
FIGS. 9A-9B shows a perspective schematic illustration of two components connected via the spacer assembly, where (FIG. 9A) top-rear view and (FIG. 9B) top-front view.
Figure 9B:
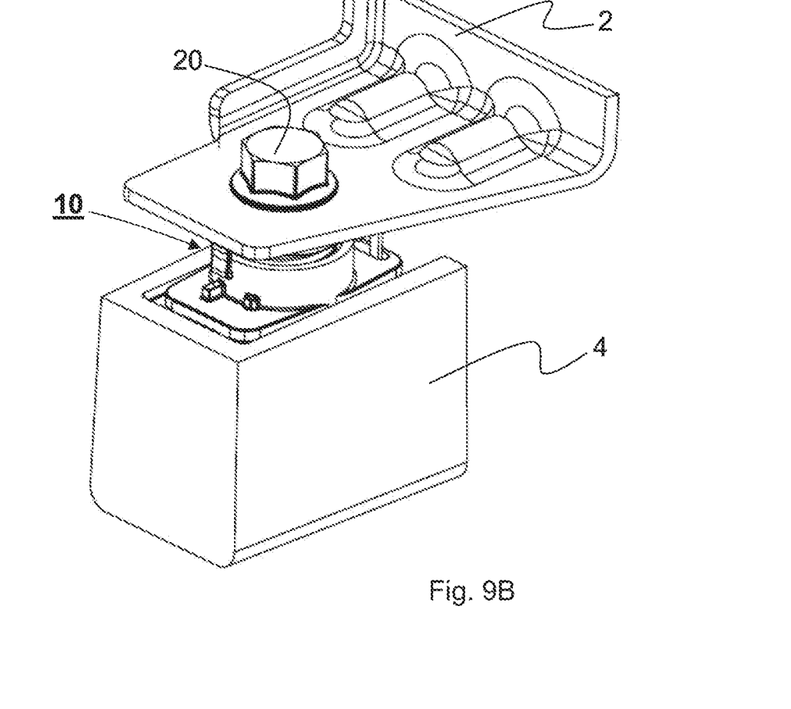

In the assembly line, the headlight (housing 4) is then fastened to the car body structure (bracket 2) by inserting connection bolt 20 (e.g. M6 metal screw) through apertures 6, 310, 8 and into engagement with the friction elements 318 and the threaded through hole 106. Connection bolt 20 is then rotated carrying along spacer member 300 via friction-fit engagement with the friction elements 318, thus axially moving the spacer member 300 out of the through-hole mount 204 and the connection bolt 20 into engagement with threaded through hole 106 until spacer member 300 has covered the distance and abuts against bracket 2. At this point, the torque required to rotate spacer member 300 relative to through-hole mount 204 exceeds the friction force provided by the friction elements 318 and connection bolt 20 moves axially into the threaded through hole 106 tightly fastening the housing 4 and bracket 2.

It is understood that the improved spacer assembly 10 comprises spacer member 300 and base member 200 made from a plastic material, and support member 100 made from a metal, therefore, providing a spacer assembly 10 that is considerably lighter than the conventional spacer devices made from metal (e.g. the improved spacer assembly is less than half the weight of an equivalent conventional spacer device), as well as, cheaper to manufacture. In addition, the spacer assembly 10 of the present invention provides an audible click when installing the spacer assembly 10 to housing 4. Further, the friction elements 318 of the spacer member 300 are configured to engage with the connection bolt 20 without damaging the bolt coating. In addition, the increased length of the threaded cylindrical body 304 of the spacer member 300 allows covering a greater gap distance between the connecting components without compromising the thread engagement under load. In addition, through-hole thread 106 of the metal support member 100 is designed so as to provide an improved clamping force at the same torque force.

Typical forces required during installation of the spacer assembly 10 of the specific example embodiment described are as follows:

Insertion force: <45 N [Newton];
Holding force: >30 N;
Opening torque of threaded spacer member 300: ca. 0.02 Nm to 0.1 Nm;
Compensation range (i.e. gap): 0 to 5.5 mm; and
Tightening torque: >9 Nm.

However, it is understood by the person skilled in the art that components of the spacer assembly 10 made from different material and/or having different dimensions (e.g. thickness of the clip 218, finger 302 or thread 210, 306) may entail force values that are different to the specific values described for the example embodiment.

It will be appreciated by persons skilled in the art that the above embodiment(s) have been described by way of example only and not in any limitative sense, and that various alterations and modifications are possible without departing from the scope of the invention as defined by the appended claims. Various modifications to the detailed designs as described above are possible. For example,

What is claimed is:

1. A spacer assembly for spaceably coupling a first and second component with a threaded connection bolt, each one of the first and second component provided with one or more fitting apertures, comprising:
    a support member, comprising a planar support plate having a through-hole with an internal support thread configured to threadingly engage with the threaded connection bolt, and a first clip portion projecting from a first support plate end in a direction substantially normal to said planar support plate, said support member being releasably mountable to the first component so as to axially align said through-hole with a first one of the one or more fitting apertures of the first component, during use;
    a base member, comprising a planar base plate having an upper surface and a lower surface opposite said upper surface, a cylindrical through-hole mount with an internal mount thread projecting from said upper surface in a direction substantially normal to said planar support plate to a predetermined mount length, and an aperture at a first base plate end configured to receive and movably retain said first clip portion, during use;
    a spacer member, comprising a cylindrical body having a central axis and an external spacer thread, configured to operably engage with said through-hole mount so as to axially move said spacer member relative to said base member when rotating said spacer member relative to said base member, and an axial through-hole with a plurality of inwardly projecting resilient friction elements configured to provide an interference fit engagement with a predetermined friction force with the threaded connection bolt, during use;
    wherein the thread-engagement between said internal mount thread and said external spacer thread is opposite to the thread-engagement between said internal support thread and the threaded connection bolt.

2. A spacer assembly according to claim 1, wherein said plurality of resilient friction elements are provided inside a central recess at a first end of said cylindrical body.

3. A spacer assembly according to claim 2, wherein said plurality of resilient friction elements are arranged radially relative said central axis so as to form an extension of said axial through-hole.

4. A spacer assembly according to claim 1, wherein said plurality of resilient friction elements are an integral part of said cylindrical body.

5. A spacer member according to claim 1, wherein said plurality of resilient friction elements comprise any one of radially spaced apart elastic collar members and rib member arranged between said radially spaced apart collar members.

6. A spacer assembly according to claim 1, said spacer member further comprising a flange member provided at a second end of said cylindrical body, opposite said first end, adapted to stoppingly engage with said through-hole mount during use.

7. A spacer member according to claim 6, said flange member comprising a resilient finger member projecting from an edge portion of said flange member in a direction parallel to said central axis towards said first end of said cylindrical body.

8. A spacer member according to claim 7, wherein said resilient finger member is elastically deformable in at least a direction radial to said central axis.

9. A spacer assembly according to claim 8, said base member further comprising at least a first locking element, configured to interferingly engage with an end portion of said resilient finger member, and a second locking element, circumferentially spaced apart from said first locking element about said central axis and configured to stoppingly engage with said end portion of said resilient finger member, during use.

10. A spacer assembly according to claim 9, wherein each one of said first locking element and said second locking element is provided on said upper surface of said planar base plate projecting normally away from said upper surface and radially outward from an outer surface of said cylindrical through-hole mount, said first locking element having a first radial length and said second locking element having a second radial length that is greater than said first radial length.

11. A spacer assembly according to claim 10, wherein said first locking element comprises a cam surface, facing radially outward from said central axis, adapted to slidingly engage with said end portion of said resilient finger member so as to move said end portion of said resilient finger member radially outward and over said first locking element during rotation of said spacer element relative to said through-hole mount.

12. A spacer assembly according to claim 11, wherein said first locking element and said second locking element project away from said upper surface to a predetermined distance from said upper surface.

13. A spacer assembly according to claim 12, wherein said predetermined distance is substantially equal to the thread pitch of said mount thread.

14. A spacer assembly according to claim 13, wherein said resilient finger member projects to a length substantially equal to said mount length.

15. A spacer assembly according to claim 1, said base member further comprising a second clip portion at a second base plate end, opposite said first base plate end, projecting from said lower surface in a direction substantially normal to said lower surface, configured to be movably secured by a second one of the one or more fitting apertures of the first component.

16. A spacer assembly according to claim 15, wherein each one of said first and second clip portion is configured to allow at least linear movement along an axis parallel to said centre axis.

17. A spacer assembly according to claim 1, wherein said predetermined friction force of said interference fit engagement between said mount thread and said spacer thread is greater than the torque required to rotate said spacer member relative to said through-hole mount, during use.

18. A spacer assembly according to claim 1, wherein the length of said cylindrical body of said spacer member is greater than said mount length.

19. A spacer assembly according to claim 1, wherein each one of said internal mount thread and corresponding said external spacer thread is a left-hand thread, and said internal support thread is a right-hand thread.

20. A spacer assembly according to claim 1, wherein said base member and said spacer member are formed from a plastic material.

21. A spacer assembly according to claim 20, wherein said plastic material comprises a polymer or a polymer compound material.

22. A spacer assembly according to claim 1, wherein said support member is made from metal.

* * * * *